July 19, 1966   R. T. BURNETT ET AL   3,261,429
BRAKE
Filed Aug. 12, 1964   2 Sheets-Sheet 1
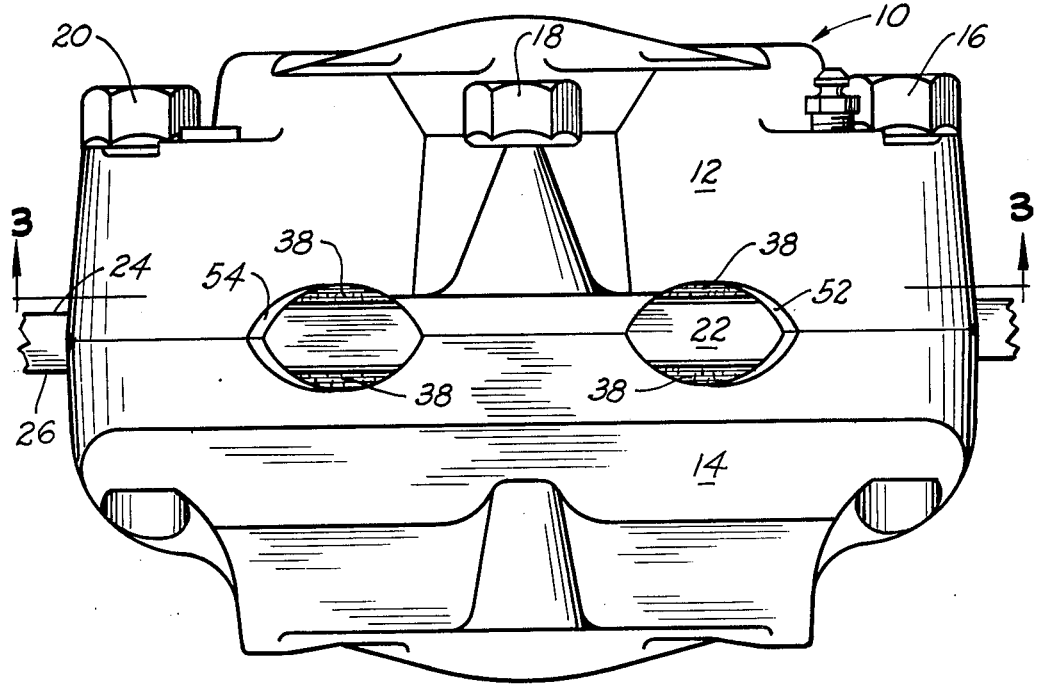
FIG_1
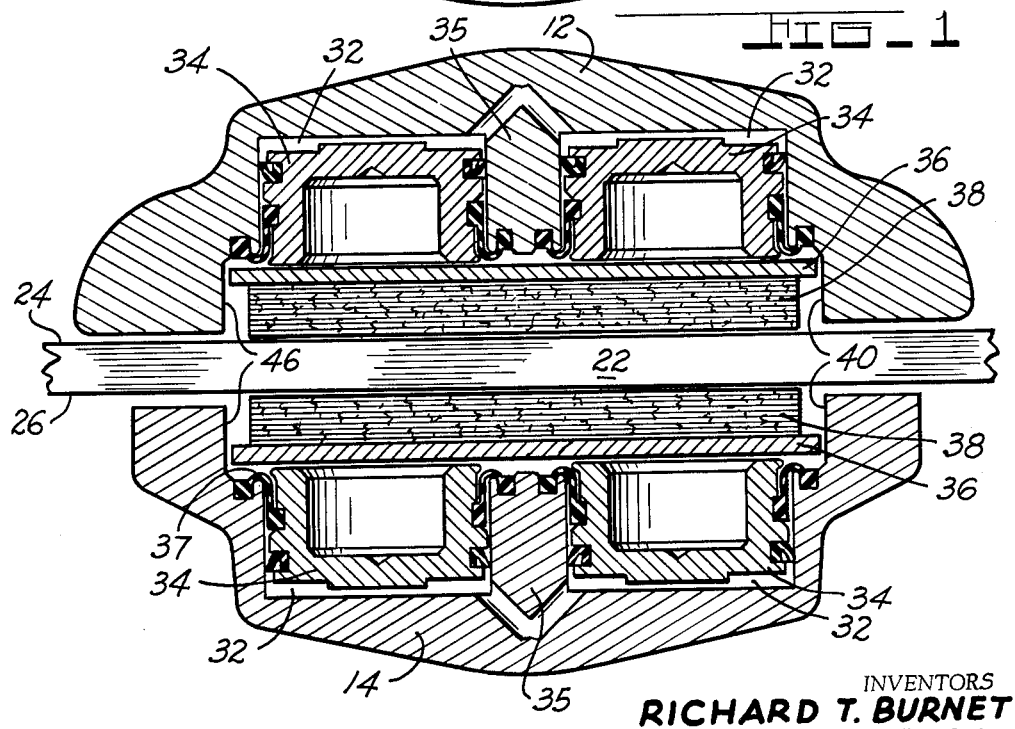
FIG_2
INVENTORS
RICHARD T. BURNETT
JOHN L. TURAK.
By Sheldon F. Raizes
ATTORNEY.

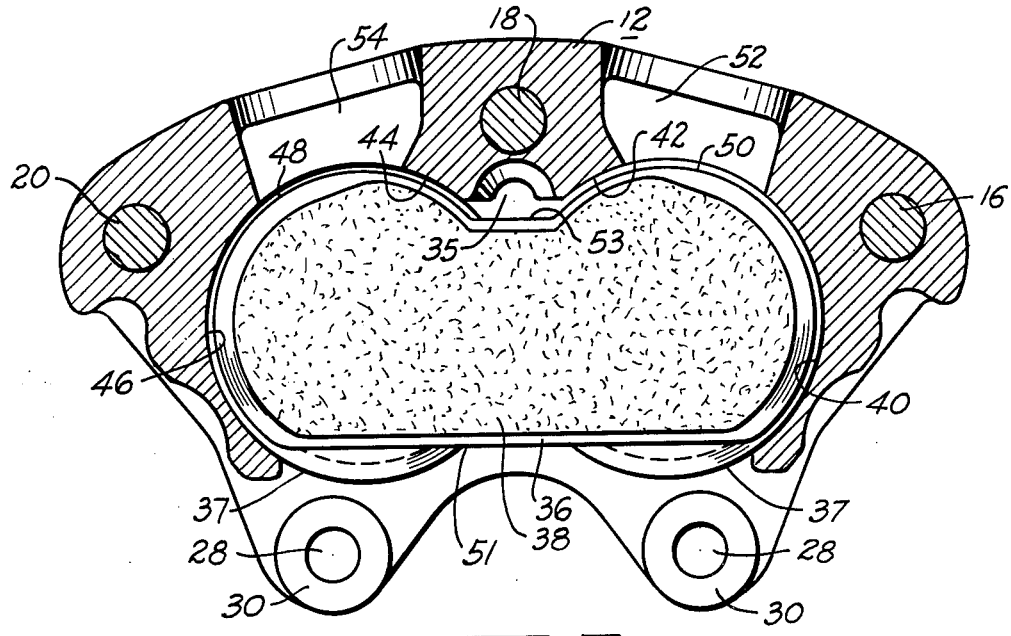
FIG_3
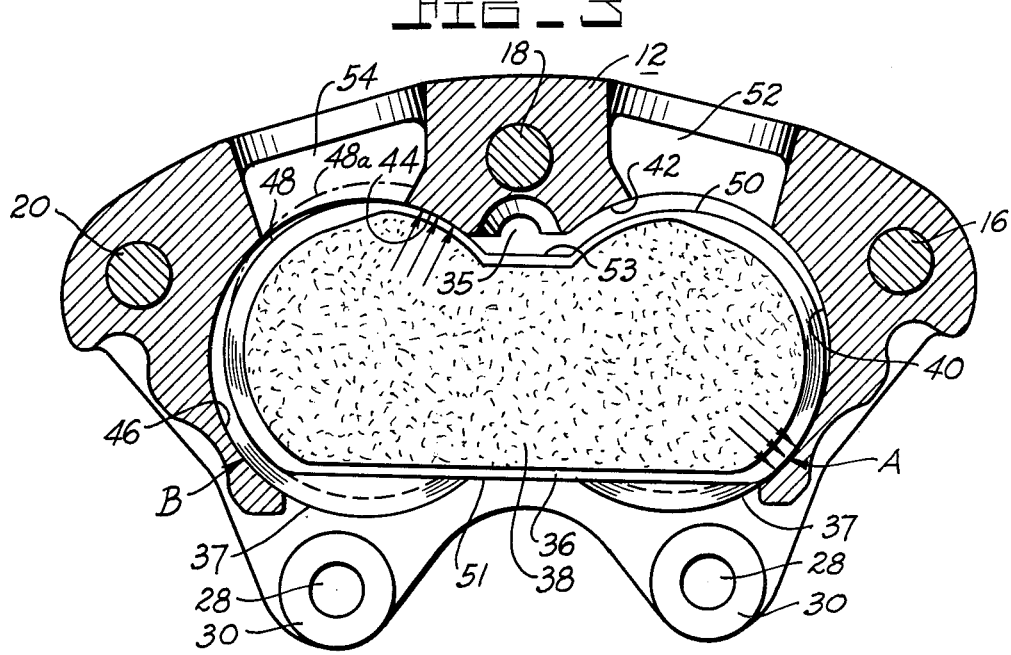
FIG_4
INVENTORS
RICHARD T. BURNETT.
JOHN L. TURAK.
BY Sheldon F. Raizes
ATTORNEY.

United States Patent Office 3,261,429
Patented July 19, 1966

3,261,429
BRAKE
Richard T. Burnett and John L. Turak, South Bend, Ind., assignors to The Bendix Corporation, South Bend, Ind., a corporation of Delaware
Filed Aug. 12, 1964, Ser. No. 389,041
5 Claims. (Cl. 188—73)

This invention concerns disc brakes and more particularly, concerns a guiding and anchoring arrangement for a brake shoe.

An object of the invention is to provide a brake shoe with anchoring and guiding means intermediate the ends thereof.

Another object of the invention is to provide a brake wherein the brake shoe transfers part of the load exerted thereon by a rotor into a housing intermediate its ends thereof.

Yet another object of this invention is to provide a disc brake wherein the load exerted on a brake shoe by a rotor is transferred to a housing carrying the brake shoe by one end of the brake shoe and by a portion of the brake shoe intermediate the ends thereof.

Other objects of the invention will become apparent to those skilled in the art from the following description with reference to the drawings wherein:

FIGURE 1 is a plan view of a brake assembly;
FIGURE 2 is a section view of FIGURE 1;
FIGURE 3 is a section taken along line 3—3 of FIGURE 1, illustrating the brake shoe and cylinder housing arrangement; and
FIGURE 4 is a view similar to FIGURE 3 only illustrating the brake shoe during brake actuation.

Referring to FIGURE 1, a housing 10, comprising two castings 12, 14 secured together by bolts 16, 18 and 20, straddles a rotor 22, having a pair of friction surfaces 24, 26 thereon. The housing 10 is secured to a stationary part of a vehicle, such as an axle flange, by a pair of bolts (not shown) extending through openings 28 in a pair of lugs 30 which extends radially inwardly from the casting 12 (see FIGURE 3). Each casting has a pair of fluid chambers 32 therein which receives a piston 34 therein. A wall 35 separates the fluid chambers. A rubber boot 37 is provided for each piston to prevent contaminates from entering the fluid chambers.

A pair of brake shoes, each comprising a backing plate 36 and friction lining 38, is interposed between the pistons and the rotor 22. The arrangement of the brake shoes with respect to the anchoring and guiding surfaces on each casting is the same and therefore the following description with reference to casting 12 and its related brake shoe will also apply to the casting 14 and its related brake shoe. The casting 12 has four axially extending circumferentially spaced arcuate surfaces 40, 42, 44 and 46 for guiding and anchoring of the brake shoe. The surface 42 is of the same radius on the same center as the surface 40 and the surface 44 is of the same radius and on the same center as the surface 46. The surfaces 40 and 42 and the surfaces 44 and 46 are concentric to the wall of their respective fluid chambers 32.

The brake shoe spans both pistons and the backing plate 36 thereof is symmetrical and has two arcuate portions 48, 50 of a given radius. The arcuate portions 48, 50 are connected at one end by a chordally extending radial inner edge 51 and at the other end by a straight edge portion 53 located on the radial outer edge of the backing plate 36. The centers of the arcuate portions 48 and 50 are spaced the same distance apart as the centers of the chambers 32. As shown in FIGURE 3, a clearance is provided between the edge of the backing plate and the anchoring and guiding surfaces 40, 42, 44 and 46 to allow for heat expansion during brake operation. This clearance is exaggerated for illustration purposes and in reality is in the vicinity of .012 inch across the diameter. An opening 52 is provided in the casting between the guiding and anchoring surfaces 40 and 42 and an opening 54 is provided in the casting between the anchoring and guiding surfaces 44 and 46. The openings 52, 54 provide for inspection of the lining and for escape of dust and heat.

FIGURE 4 illustrates the position of the brake shoe during brake operation when the rotor 22 is rotating in a clockwise direction. In this instance, the rotor will shift the brake shoe in a circumferential direction to the right with the edge 50 of the backing plate bearing on an area of the anchoring surface 40 designated generally as "A" and will rotate the left-hand side of the brake shoe in a clockwise direction radially outwardly until the edge 48 of the backing plate 36 bears on the anchoring surface 44. Assuming braking during rotor rotation in a counterclockwise direction, the edge 48 of the backing plate 36 will bear on an area of the anchoring surface 46 generally designated as "B" and the edge 50 of the backing plate 36 will bear on the anchoring surface 42. Therefore, depending upon rotation of the rotor during braking, the anchoring load will be divided between the anchoring surfaces 40 and 44 or the anchoring surfaces 46 and 42.

It is desired to keep radial outward movement of the brake shoe at a minimum. The provision of the anchoring surfaces 42 and 44 accomplishes this purpose since it limits the radial outward movement of the brake shoe whereas, if the shoe anchored on both surfaces 40 and 46 at the same time, the brake shoe would be displaced a further distance radially outwardly before contacting the anchoring surface 46 as can readily be seen in FIGURE 4 by the phantom line 48a outlining the edge of the backing plate 36. Also, as can be seen from the phantom line 48a, there would only be a point contact between the edge 48 and the surface 46 rather than an area contact as shown between edge 48 and surface 44. This point contact will result in damaging the backing plate 36 and the corner of the surface 46 at their point of contact, increasing the possibility of the shoe jamming or dragging upon brake release. The location of the anchoring surfaces 42 and 44 also provides inherent rigidity to the housing 10.

While the invention has been described in considerable detail, we do not wish to be limited to the particular construction shown and described, and it is our intention to cover thereby all novel adaptations, modifications and arrangements thereof which appear obvious to those skilled in the art to which the invention relates and which come within the scope of the following claims.

We claim:

1. In a disc brake: a rotor having friction surfaces thereon, a housing extending opposite one of said friction surfaces, a friction member slidably carried by said housing and located opposite said one friction surface, said friction member having a first pair of circumferentially spaced end anchoring surfaces thereon and a second pair of circumferentially spaced anchoring surfaces intermediate the ends thereof, said housing having a first set of circumferentially spaced anchoring surfaces located adjacent a respective one of said pair of end surfaces of said friction member for engagement thereby, said housing further having a second set of anchoring surfaces located adjacent a respective one of and between said second pair of anchoring surfaces on said friction member for engagement thereby, means for engaging said friction member with said rotor, said friction surfaces being arranged relative to each other that upon braking during rotor rotation in one direction, one of said first pair and one of said second pair of anchoring surfaces on said friction member will anchor on one of said first set and on one of said second set of anchoring surfaces of said housing, respectively, and upon braking during rotor rotation in the opposite direction, the other of said first pair and the other of said second pair of anchoring surfaces of said friction member will anchor on the other of said first set and the other of said second set of anchoring surfaces of said housing, respectively, said one of said first set and said other of said second set of anchoring surfaces on said housing being arcuate shaped of the same radius and center, said other of said first set and said one of said second set of anchoring surfaces on said housing being arcuate shaped of the same radius and center, said one of said first pair and said other of said second pair of anchoring surfaces on said friction member being arcuate shaped of the same radius and center, said other of said first pair and said one of said second pair of anchoring surfaces on said friction member being arcuate shaped of the same radius and center, the radius of the anchoring surfaces on said friction member being less than the radius of their respective anchoring surfaces on said housing.

2. The structure as recited in claim 1 wherein said one anchoring surface of said first set of anchoring surfaces and said other anchoring surface of said second set of anchoring surfaces on said housing are generally diametrically opposite each other and said other anchoring surface of said first set of anchoring surfaces and said one anchoring surface of said second set of anchoring surfaces on said housing are generally diametrically opposite each other.

3. The structure as recited in claim 1 wherein the second pair of anchoring surfaces on said friction member is located on the radial outer edge of said friction member and the second set of anchoring surfaces on said housing is located on the radial outer portion of said housing, an opening between at least one of said first set of anchoring surfaces and one of said second set of anchoring surfaces on said housing and extending to the radial outer edge of said housing.

4. The structure as recited in claim 1 wherein said friction member comprises a backing plate with friction lining secured thereto, said backing plate having a generally straight chordally extending edge, a pair of arcuate edges of a given radius and whose centers are circumferentially spaced, each arcuate edge terminating at one end at one circumferentially spaced end of said chordally extending edge and terminating at its other end facing in a direction generally toward said chordally extending edge, a straight edge portion generally parallel to said chordally extending edge and connecting said other ends of said arcuate edges, the portions of said arcuate edges of said backing plate adjacent said one end thereof being said first pair of anchoring surfaces of said friction member and the portions of said arcuate edges of said backing plate adjacent said other end thereof being said second pair of anchoring surfaces of said friction members.

5. The structure as recited in claim 4 wherein said second set of anchoring surfaces on said housing is located radially outwardly of said second pair of anchoring surfaces on said backing plate and said second pair of anchoring surfaces on said backing plate and said straight edge portion being located radially outwardly of said chordally extending edge thereof.

References Cited by the Examiner

UNITED STATES PATENTS 3,183,999  5/1965  Buyze et al. _____ 188—152

FOREIGN PATENTS 842,913  7/1960  Great Britain.

FERGUS S. MIDDLETON, *Primary Examiner.*

MILTON BUCHLER, *Examiner.*

G. E. A. HALVOSA, *Assistant Examiner.*